United States Patent [19]

Redford et al.

[11] Patent Number: 5,031,997
[45] Date of Patent: Jul. 16, 1991

[54] OPEN BREECH HOT LAUNCHED FIBER OPTIC PAYOUT SYSTEM

[75] Inventors: Gary R. Redford; Daniel K. Schotter; Stanley P. D. Peterson, all of Tucson, Ariz.

[73] Assignee: Hughes Aircraft Company, Los Angeles, Calif.

[21] Appl. No.: 500,449

[22] Filed: Mar. 28, 1990

[51] Int. Cl.[5] .................................................. G02B 6/44
[52] U.S. Cl. ............................. 350/96.23; 350/96.30; 244/3.16
[58] Field of Search ............... 350/96.10, 96.23, 96.24, 350/96.29, 96.30; 244/3.12, 3.16

[56] References Cited

U.S. PATENT DOCUMENTS

| | | | |
|---|---|---|---|
| 4,525,702 | 6/1985 | Kitagawa et al. | 350/96.23 X |
| 4,799,760 | 1/1989 | Beatty et al. | 350/96.23 |
| 4,893,893 | 6/1990 | Claxton et al. | 350/96.23 |
| 4,932,746 | 6/1990 | Calzolari et al. | 350/96.23 |

Primary Examiner—John D. Lee
Assistant Examiner—Phan T. Heartney
Attorney, Agent, or Firm—C. D. Brown; R. M. Heald; W. K. Denson-Low

[57] ABSTRACT

An optical fiber (18) payout system for a missile (10) which is to be hot-launched from a tube (12) reinforces that part of the fiber to be exposed to propulsion gases by juxtaposing with one or more wires (24) and encasing within a thermally protective sheath (22) forming a so-called leader (20). The leader (20) extends outwardly of the missile aft end (16) and is releasably secured within a rail assembly (32) by a flexible strip (46) having a line of perforations (48) extending along its longitudinal axis. The outer end portion of the leader (20) is secured to an anchor block (52). On launch, the leader (20) tears loose from the flexible strip (46), the restraining action of which prevents optical fiber predispensing.

18 Claims, 5 Drawing Sheets

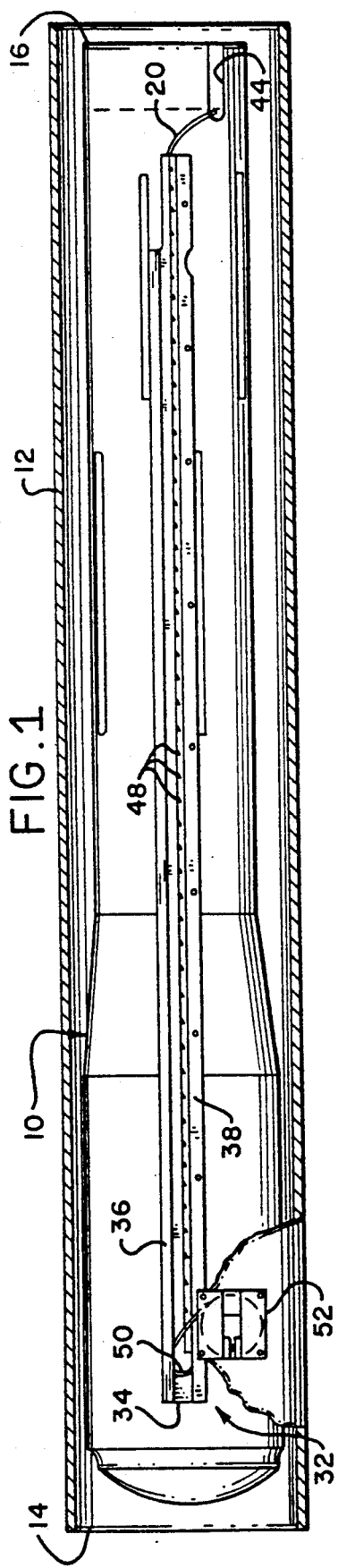
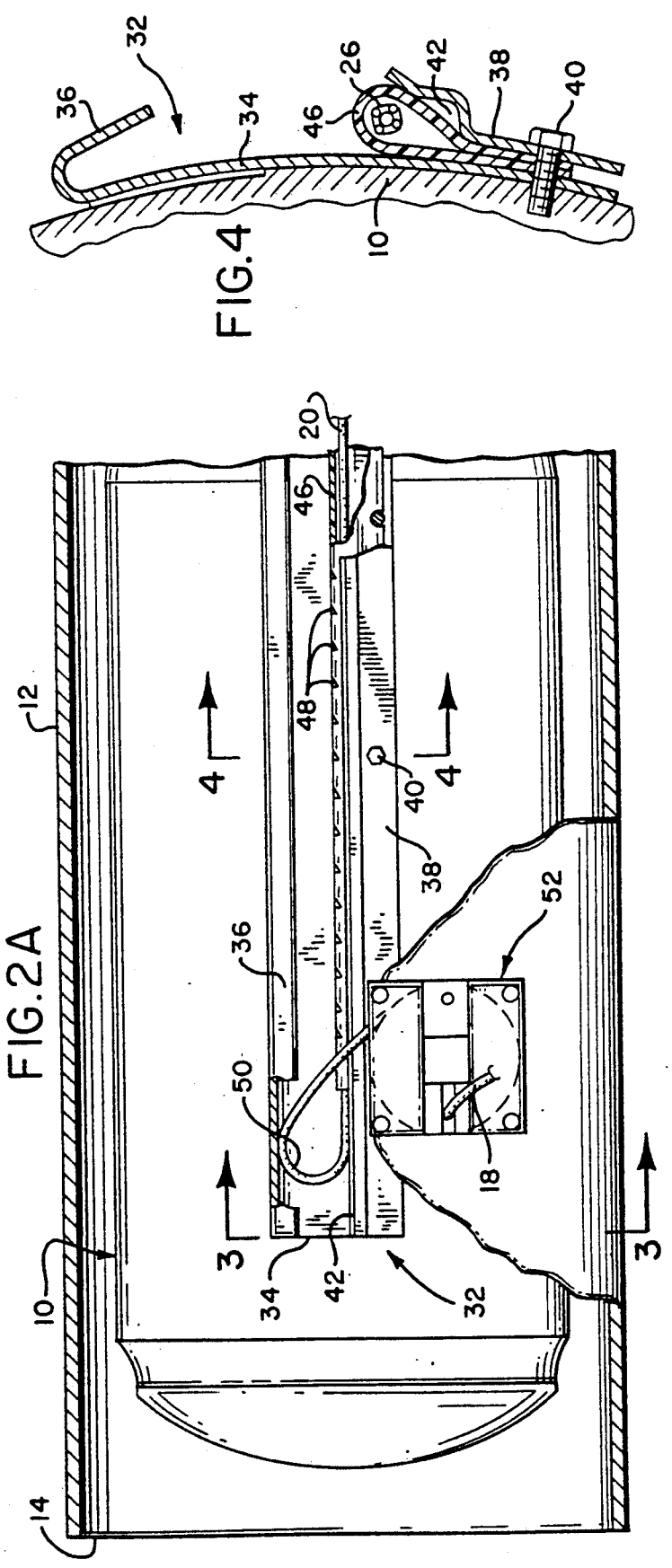

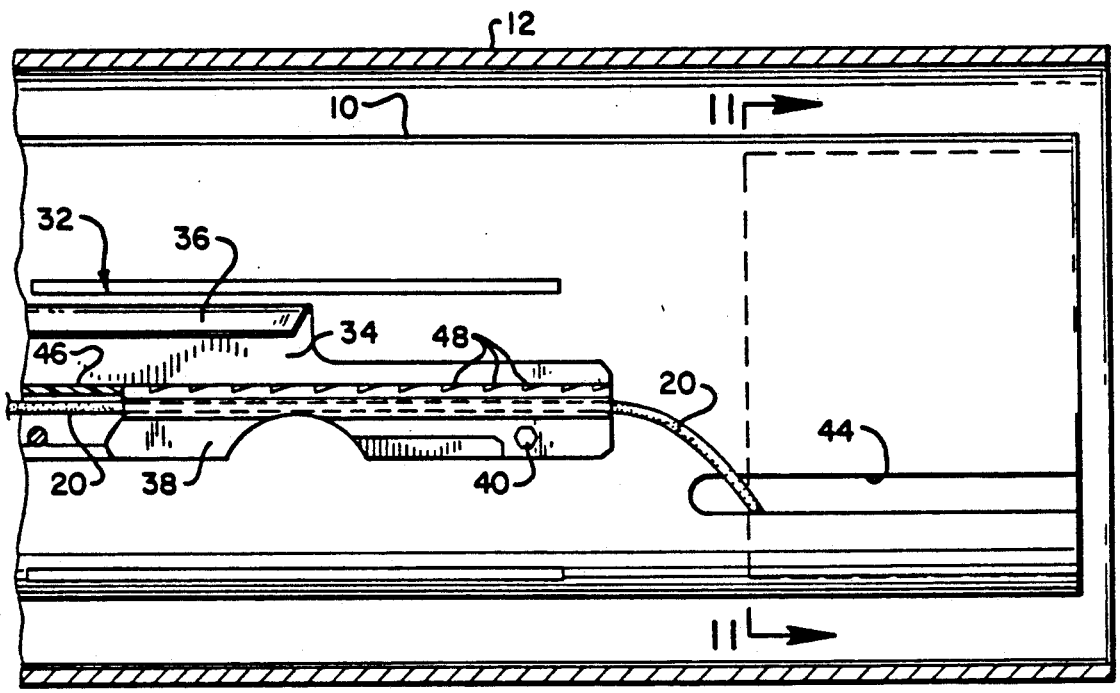
FIG. 2B
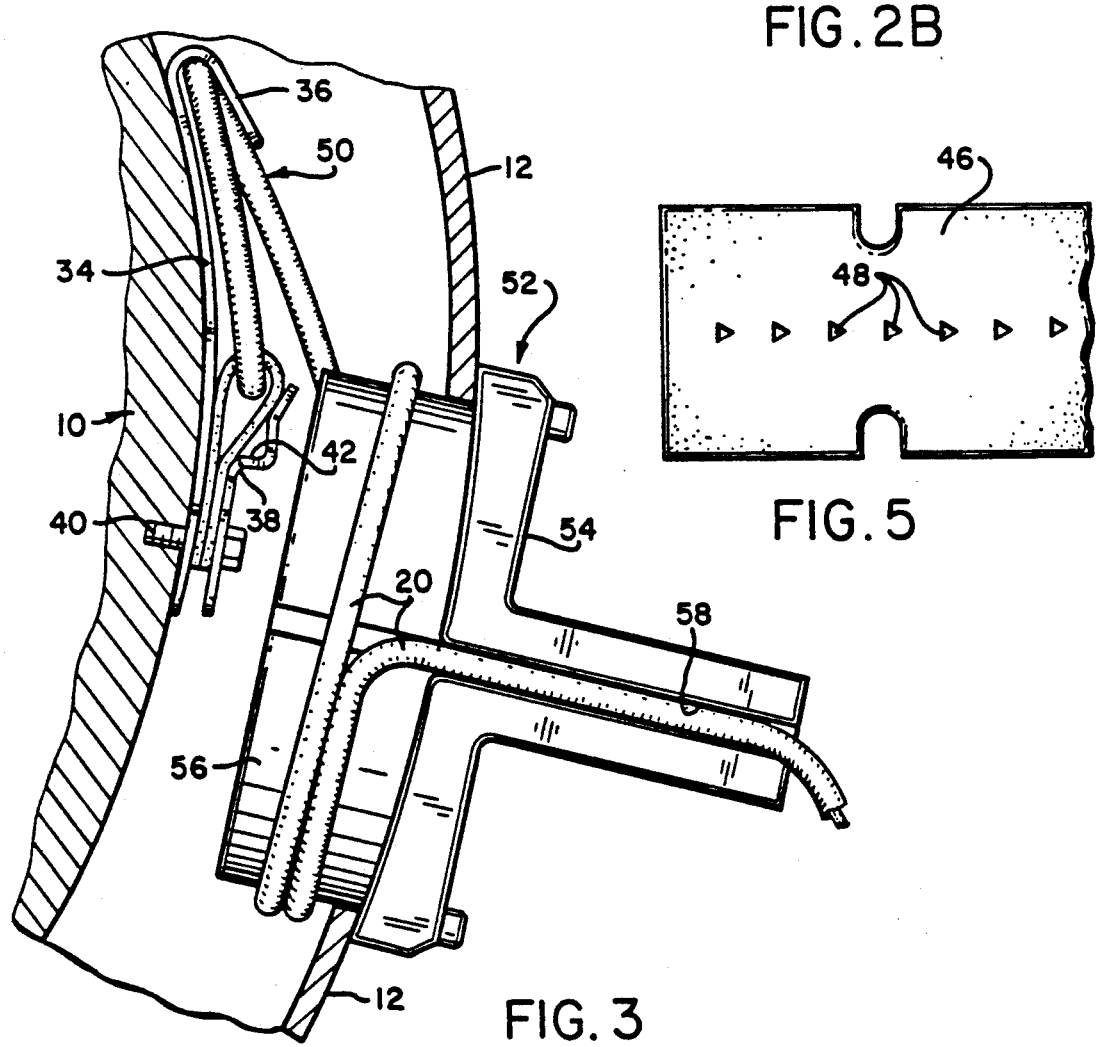
FIG. 5
FIG. 3

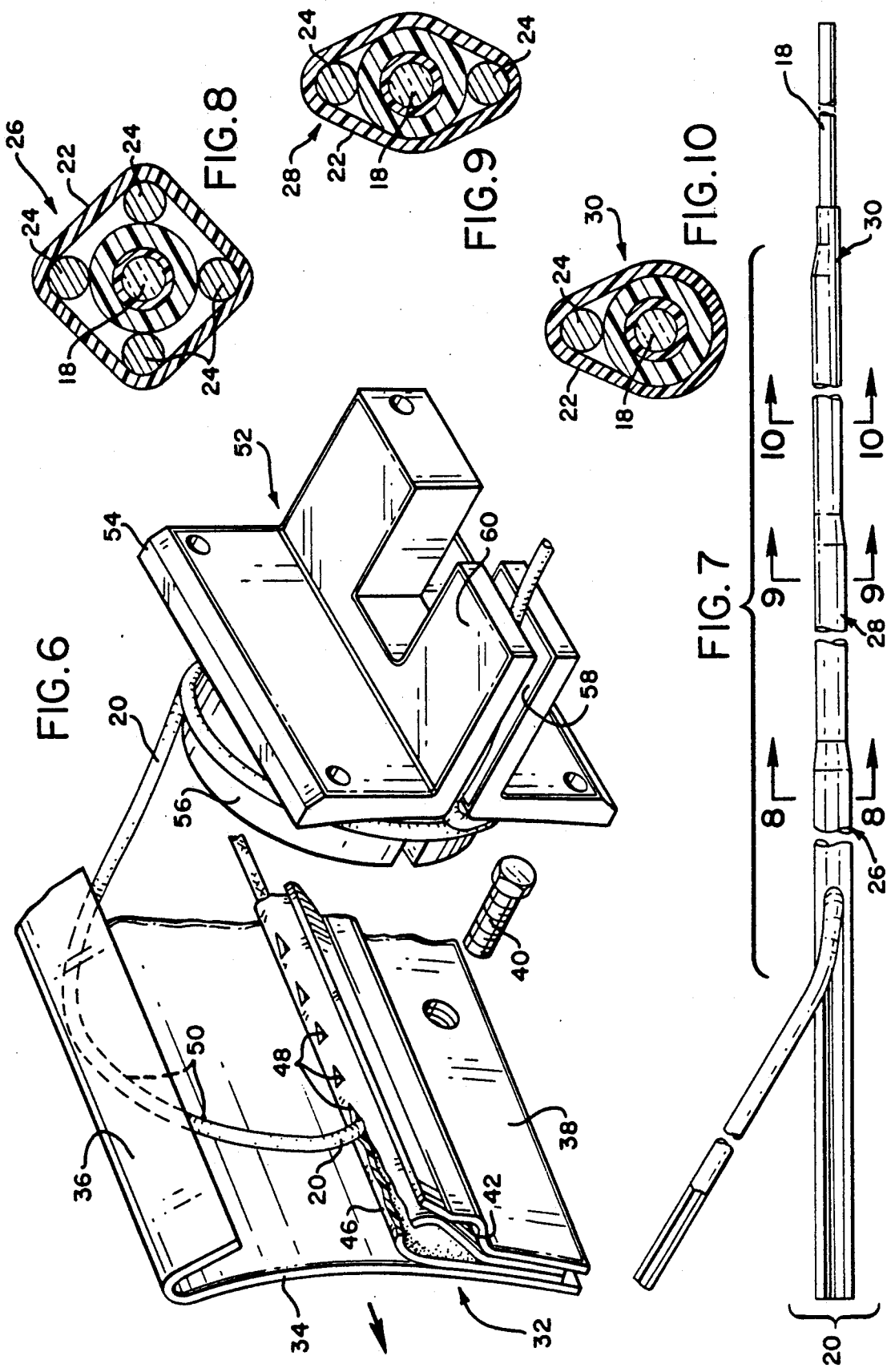

OPEN BREECH HOT LAUNCHED FIBER OPTIC PAYOUT SYSTEM

This invention was made with Government support under Contract No. DAAH01-86-C-060 awarded by The Department of the Army. The Government has certain rights in this invention.

BACKGROUND OF THE INVENTION

1. Field of the Invention

The present invention relates generally to an optical fiber payout system, and, more particularly, to such a system for paying out a fiber from an airborne missile dispenser to form a data link with launch site equipment.

2. Description of the Related Art

Many present day weapon systems include a missile having a filament data link that is maintained with launch site apparatus throughout a part or all of the missile flight. Specifically a length of metal wire or an optical fiber is wound into a stack aboard the missile and, in the usual situation, the other end of the fiber is anchored at the launch site. On launch, the dispenser allows the filament to unwind at a sufficiently rapid rate in order to maintain the link.

A number of criteria must be met achieving a satisfactory filament dispensing system for serving as a missile data link. Initially, payout has to be accomplished with a minimum of tension on the filament to prevent breakage and, in the case of an optical fiber, it is even necessary to prevent micro-bending which has been found can substantially reduce the quality of signal transmission. Because of this problem, placement of the dispenser on the missile has to be carefully considered and ducting or guiding of the filament during dispensing can only be accomplished in a manner not tending to stress or bend the optical fiber.

Also, where the missile is being hot launched, difficulty is presented in that either the fiber must be dispensed in a manner to avoid the hot propulsion gases, or steps must be taken to prevent the fiber from being injured or destroyed by contact with the hot gases. Still further, it is necessary to prevent a condition termed "pre-dispensing" which, in essence, is the initial increase in the dispensing rate due to the rapid flow of propulsion gases resulting in excess filament being dispensed during the early stages of missile flight.

It is desirable to be able to pass the filament through the propulsion gases on dispensing in order to avoid the mentioned difficulties of bending, breaking or stressing the filament that frequently occurs when the fiber is directed along an out of the way path in order to avoid passing through the propulsion gases.

SUMMARY OF THE INVENTION

It is, therefore, a primary aim and object of the present invention to provide a system for dispensing a filament directly through the hot gases of a missile propulsion motor without damaging the filament.

Another object is the provision of a filament dispensing system as in the previous object which prevents pre-dispensing.

In accordance with the present invention, a wound stack of filament, preferably an optical fiber, mounted within a missile has an initial length of the fiber extending from the stack outwardly of the missile encased within a protective material forming a so-called leader which can pass directly through the hot propulsion gases without resulting in damage to the enclosed fiber. A first length of the leader includes four reinforcing wires to withstand the relatively high g loading on rocket motor initiation, followed by a two-wire reinforcement, a one-wire reinforced section, and finally the optical fiber without leader encasement or reinforcing wires. The leader passes through a slot in the aft fairing after which it is sandwiched between a perforated tape and a metal retainer, the latter being secured to the outer surface of the missile.

The missile on leaving the launch tube begins to dispense the fiber by initially pulling the leader off the retainer and rupturing the perforated tape as it comes off. The leader extends through the propulsion gases during the intial part of the launch and the amount of leader is of predetermined length in order to provide full protection for the fiber throughout the boost period. The reinforced leader and tape securement to the retainer prevents pre-dispensing.

BRIEF DESCRIPTION OF THE DRAWING

In the accompanying drawing:

FIG. 1 is a side elevational, partially sectional view of a missile modified in accordance with the present invention and located within a launch tube;

FIGS. 2A and 2B are further side elevational, sectional views showing various parts in greater detail;

FIG. 3 is an end elevational, sectional, partially fragmentary view taken along the line 3—3 of FIG. 2A;

FIG. 4 is a further end elevational, sectional, partially fragmentary view taken along the line 4—4 of FIG. 2A;

FIG. 5 is an enlarged plan view of retaining tape;

FIG. 6 is an enlarged, partially fragmentary view of the anchor block and fiber retainer shown in operative relation to one another;

FIG. 7 is a side elevational, partially fragmentary view of fiber leader;

FIGS. 8, 9 and 10 are sectional views taken along the lines 8—8, 9—9 and 10—10, respectively, of FIG. 7;

DESCRIPTION OF A PREFERRED EMBODIMENT

Figure 12:
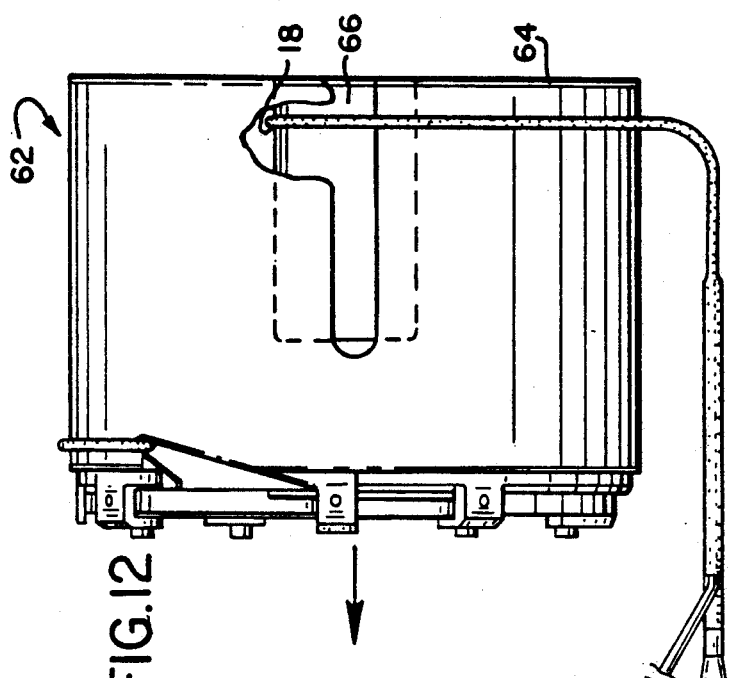
FIG. 12 is a side elevational, sectional view taken along the line 12—12 of FIG. 11.

With reference now to the drawings and particularly FIG. 1, a missile 10 is shown included within a launch tube 12 from which it is fired in a conventional manner from the tube open end 14 by hot propulsion gases emitted from the aft end 16 of the missile. The category of missile with which the present invention is most advantageously employed includes a filamentary data link which interconnects apparatus aboard the missile with apparatus remaining at the launch site throughout a part or all of the missile flight. Specifically, the data link consists of a length of a filament 18, preferably an optical fiber, one end of which interconnects with apparatus aboard the missile and the other end of which remains at the launch site. Also, as will be described in greater detail, one end portion of the fiber is wound into a stack that remains with the missile and the opposite end portion of the fiber is anchored at the launch site. When the missile is launched, the stack unwinds to maintain a continuous functioning data link between the missile and launch site.

It is important that the optical fiber not be stressed, kinked or twisted to the extent that it would be severed or have the quality of signal being transmitted diminished. In addition, an optical fiber filament cannot survive, without special protection, exposure to the high temperatures of the inside propulsion gases. Since it is a fundamental aspect of the present invention that the missile will be launched with the fiber being exposed to the propulsion gases, that length of the fiber which will be exposed to the hot gases has been especially protected in a manner to be described forming what will be referred to as a leader 20 (FIG. 7).

For the ensuing details of leader construction reference is made to FIGS. 7 through 10. For the outermost length of the leader, the fiber 18 is enclosed within a protective sheath 22 with four supporting and reinforcing metal wires 24 extending along the outside surface of the fiber (FIG. 8). The sheath 22 is constructed of a flexible, heat resistant plastic or rubber. Wire enforcement is necessary since the force that will be impressed upon the leader during the initial high-acceleration phase of propulsion will be extensive and would immediately snap a fiber not coupled with reinforcing wires. After a suitable length of the four wire protection part of the leader enumerated generally as 26 in FIG. 7, an immediately adjacent length 28 of the leader has the fiber protected by only a pair of wires as shown in FIG. 9, which is acceptable because at this phase of the propulsion that the leader part 28 is exposed to the propulsion gases, stress on the leader is substantially reduced. Finally, the inner end portion 30 of the leader includes a single reinforcing wire (FIG. 10). The one-wire reinforced part 30 terminates at the conclusion of the propulsion phase and the remainder of data link dispensed thereafter from the missile consists of merely the optical fiber 18 without protective sheath or reinforcing wires.

The following detailed description of the leader retention and stress relieving mechanism of the invention is made particularly with reference to FIGS. 1, 2A, 2B and 4. An elongated rail assembly 32 is affixed to an outer surface of the missile and extends longitudinally of the missile substantially parallel to the missile cylindrical axis. The rail assembly includes an elongated generally rectangular metal strip 34 having one lateral edge which is folded back over itself at 36 forming a hook-like receiving channel extending along the strip edge. An elongated metal retainer strip 38 is secured to the opposite or unfolded edge via a plurality of threaded members 40 forming a recess 42 which faces towards the folded over edge 36.

The leader 20 which is interconnected within the missile to dispensing apparatus to be described extends through a slot 44 to pass outwardly of the missile and along the recess 42 formed by strip 38. More particularly, the leader 20 is held within the recess 42 by a plastic strip 46 of generally rectangular geometry having a longitudinal set of perforations 48 along its center line. The strip 46 also has adhesive on the surface facing the leader. In assembly, the leader is laid along the line of perforations with the two edge portions of the strip folded onto one another and held within the recess by the threaded members 40 (FIG. 4).

The end of the leader extending beyond the retaining strip is then formed into a loop 50 which is curved back toward the missile aft end and placed in the folded edge channel 36. The outermost end of the leader 20 is received within an anchor block 52 to be described, beyond which the leader terminates and a fiber extends from the leader to be suitably anchored.

Anchor block 52 has a plate 54 with a cylindrical post 56 extending from a major surface of the plate (FIG. 6). The plate is mounted to the launch tube with the post 56 extending through the tube wall. The leader adjacent the loop 50 is wrapped in a forward direction one full revolution after which it passes through an oversized opening in the tube wall and along a slot 58 in an extension wall 60 of plate 54 (FIGS. 3 and 6) to the launch site dispenser (not shown).

When launched, the missile moves to the left as it is depicted in FIG. 1 which, since the outer end of the leader 20 is held by the anchor block 52, causes the leader to be torn loose from the retaining strip along the line of perforations 48 with the continuous leader loop 50 from the anchor block to the rail being generally retained within the folded over edge channel 36. This action is shown in FIGS. 13-16. Finally, when the entire leader is removed from the rail assembly, substantially all of the four wire protected section 26 of the leader is dispensed and as the leader portion which lies in the slot is pulled loose from the slot, the internal dispensing means pays out the two-wire reinforced leader 28, next the one-wire reinforced leader 30, and finally merely unprotected fiber 18. Fiber dispensing continues to maintain the data link for the prescribed amount of the missile flight path.

Figure 11:
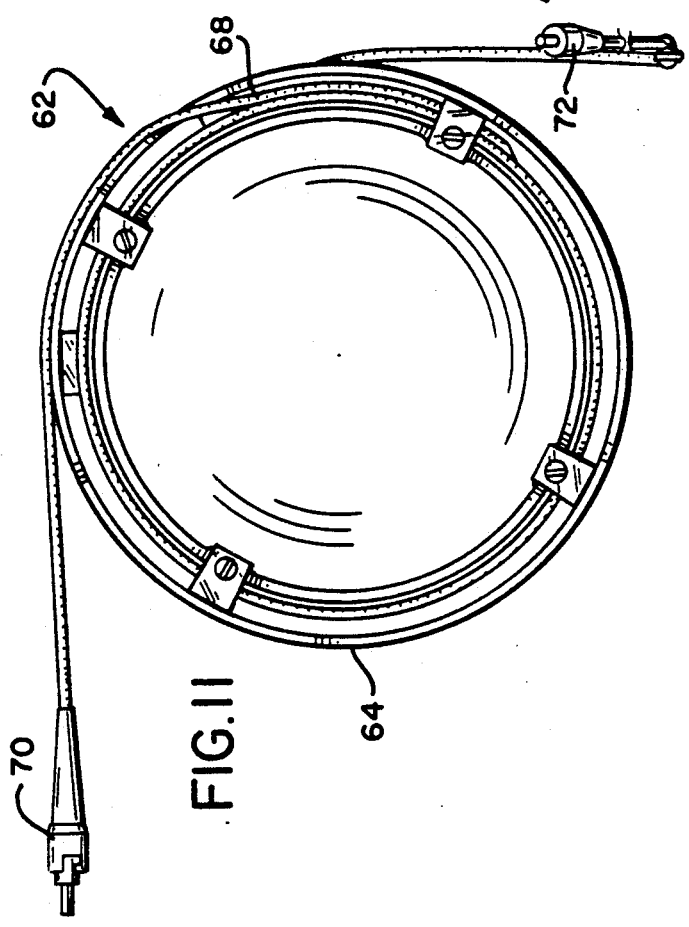
FIG. 11 is a top plan view of an optical fiber dispensing canister for use with the invention.
Figure 13:
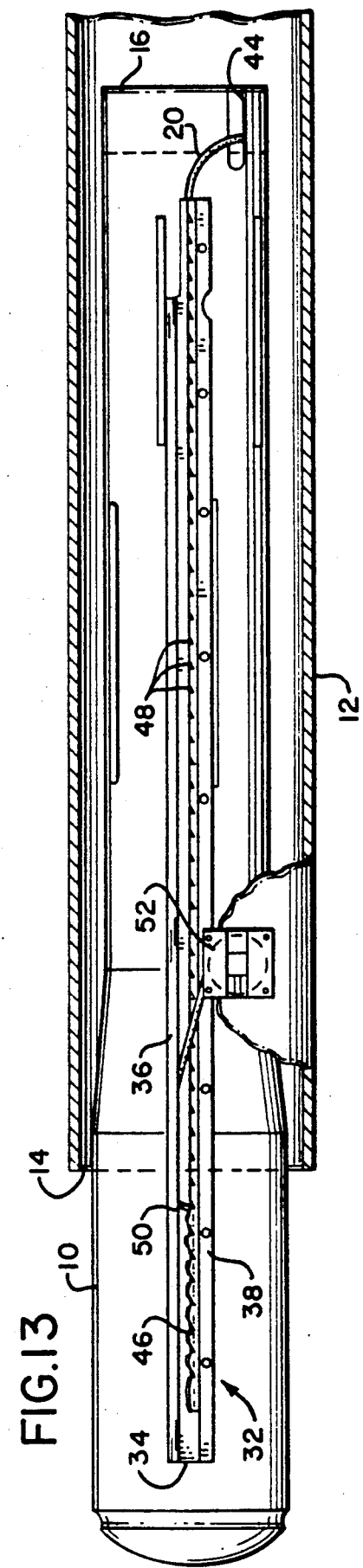
FIGS. 13 through 16 show side elevational views of the operation and dispensing of the optical fiber during the different missile launch stages.
Figure 14:
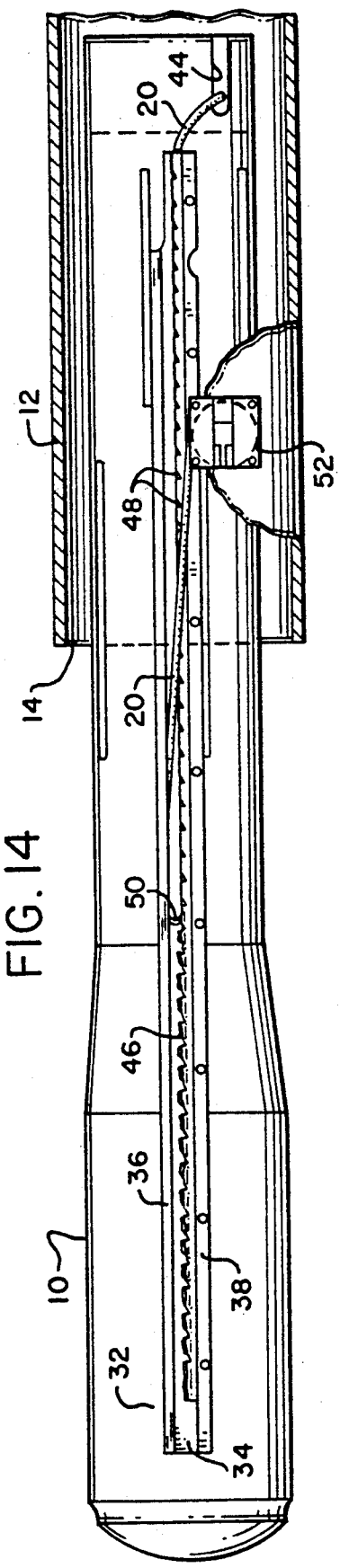
Figure 15:
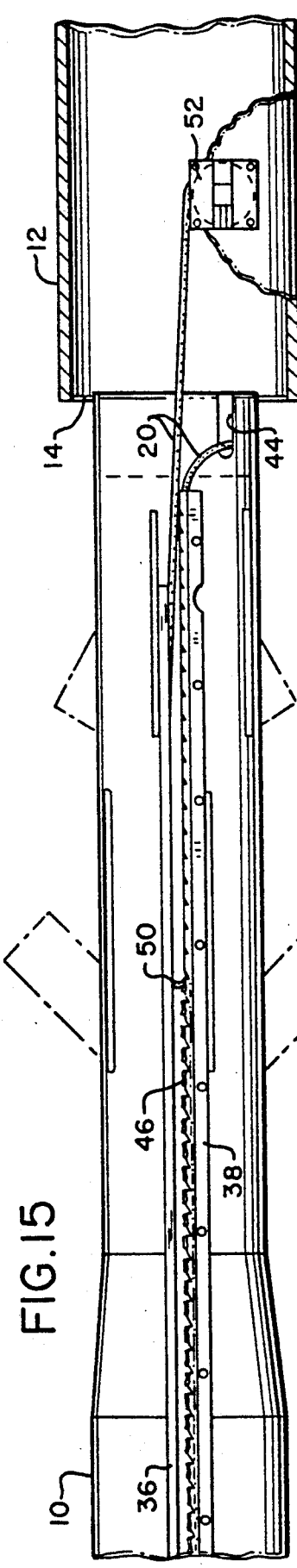
Figure 16:
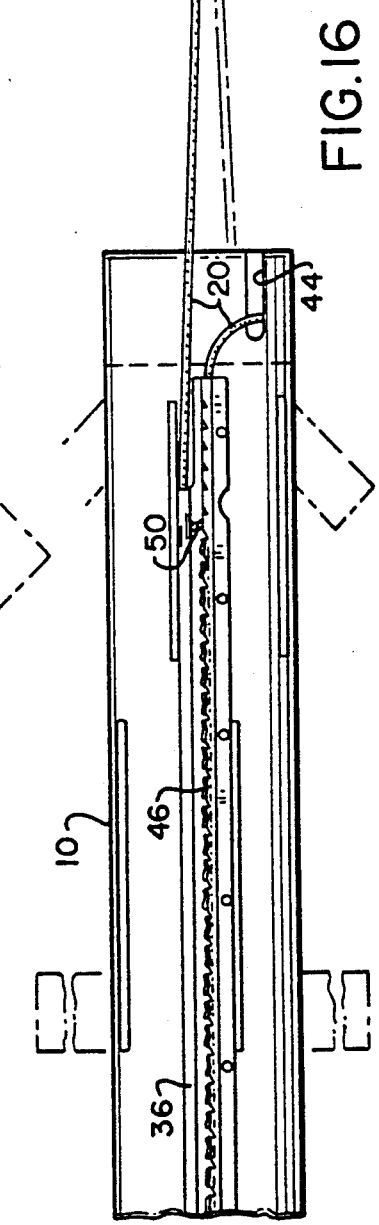

FIGS. 11 and 12 disclose a preferred form of fiber dispensing canister 62 for use with the described system. Specifically, the canister includes a hollow, generally cylindrical container 64 having a concentrically arranged drum 66 about which the fiber 18 and some of the leader 20 is wound. One end portion of the fiber extends through a closed end 68 of the container and has a conventional connector 70 for effecting termination with apparatus aboard the missile. The opposite end of the container 64 is open and the other end of the fiber encased in a sheath to form the leader 20 extends outwardly of the open end for securement to the missile outer surface as already described and termination with launch site apparatus via conventional connector 72. Missile flight direction with respect to the canister mounted within the missile is indicated by the arrow.

Although the present invention is described in connection with a preferred embodiment, it is to be understood that those skilled in the appertaining arts may make modifications that will come within the ambit of the appended claims.

What is claimed is:

1. A system for paying out an optical fiber missile data link from a wound stack aboard the missile through the propulsion gases, comprising:

a protective sheath surrounding a length of the fiber, said sheath comprising a flexible tubular member constructed of a heat resistant material within which the fiber is received and having a first number of reinforcing wires within a first portion of the length of said sheath closest to said wound stack, a second number of reinforcing wires within a second portion of the length of said sheath said second number being greater than said first number, and a third number of reinforcing wires within a third portion of the length of said sheath said third number being greater than said second number, and said second portion being located between said first and third portions; and means for releasably securing the protective sheath and included fiber onto an outer surface of the missile.

2. The system according to claim 1 wherein said first number is one, said second number is two, and said third number is four.

3. A system as in claim 1, in which the releasable securing means includes a metal strip with one lateral edge folded over to form a channel, a retainer strip secured to the metal strip other lateral edge forming a recess, a plastic strip received over the sheath means and secured within the recess, said plastic strip being torn loose by the sheath means on missile launch.

4. A system as in claim 3, in which the plastic strip has a line of perforations extending longitudinally of said strip, and adhesive on the surface facing the sheath.

5. Optical fiber payout system for a rocket powered missile hot-launched from a tube, comprising:
a wound pack of the optical fiber mounted within the missile for being dispensed on missile launch and having a length of the fiber extending from the missile aft end;
first means mounted on the tube for securing the optical fiber exiting the missile aft end; and
second means for releasably securing the optical fiber intermediate the first means and the missile aft end to an outer surface of the missile;
said optical fiber being released from the second means on missile launch.

6. Optical fiber payout system as in claim 5, in which the first means includes a post extending from the tube toward missile for receiving the optical fiber looped thereabout.

7. Optical fiber payout system as in claim 5, in which the missile aft end includes a wall having a slot therein via which the fiber passes to the missile exterior.

8. Optical fiber payout system as in claim 5, in which the second means includes an elongated open retainer secured to the missile outer surface extending generally parallel to the missile longitudinal axis; and a strip holding the optical fiber within the retainer.

9. Optical fiber payout system as in claim 8, in which the strip is elongated with a plurality of perforations being arranged in a line extending longitudinally of the strip, said strip having its two lateral edge portions overlapping each other to enclose the optical fiber, the overlapped strip edge portions being secured to the retainer; said strip being torn along the line of perforations on missile launch releasing the fiber from the retainer.

10. Optical fiber payout system as in claim 9, in which the strip is constructed of thin sheetlike readily tearable material, and an adhesive is provided on the strip surface facing the optical fiber.

11. Optical fiber payout system as in claim 8, in which the retainer includes an elongated metal plate having the opposite lateral edge portions bent back over the retainer on the same side to form a pair of open recesses facing one another; the strip being secured in one recess and a loop of optical fiber extending from the strip being located in the other recess.

12. Optical fiber payout system as in claim 9, in which the strip is elongated with a plurality of perforations being arranged in a line extending longitudinally of the strip, said strip having its two lateral edge portions overlapping each other to enclose the optical fiber, the overlapped strip edge portions being secured to the retainer; said strip being torn along the line of perforations on missile launch releasing the fiber from the retainer.

13. Optical fiber payout system as in claim 12, in which the strip is constructed of thin sheetlike readily tearable material, and an adhesive is provided on the strip surface facing the optical fiber.

14. Optical fiber payout system as in claim 5, in which the length of fiber extending from the missile aft end includes a thermal protective sheath about the optical fiber and at least one reinforcing wire.

15. Optical fiber payout system as in claim 14, in which the second means includes an elongated open retainer secured to the missile outer surface extending generally parallel to the missile longitudinal axis; and a strip holding the optical fiber within the retainer.

16. Optical fiber payout system as in claim 15, in which the retainer includes an elongated metal plate having the opposite lateral edge portions bent back over the retainer on the same side to form a pair of open recesses facing one another; the strip being secured in one recess, and a loop of optical fiber extending from the strip being located in the other recess.

17. Optical fiber payout system as in claim 14, in which the missile aft end includes a wall having a slot therein via which the fiber passes to the missile exterior.

18. Optical fiber payout system as in claim 14, in which an initial part of the sheath closest to the wound pack has one reinforcing wire, a second part of the sheath adjacent the sheath initial part has two reinforcing wires, and a third part of the sheath adjacent the sheath second part has three reinforcing wires.

* * * * *